Jan. 30, 1934. F. C. LAVARACK ET AL 1,945,488
CABLE SUPPORT
Filed March 5, 1932
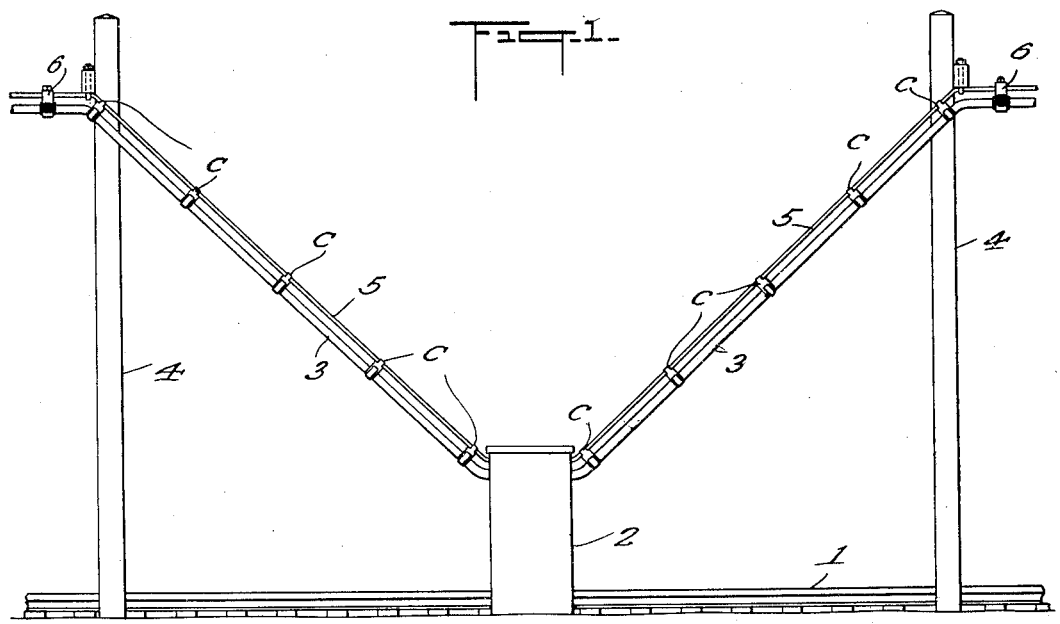
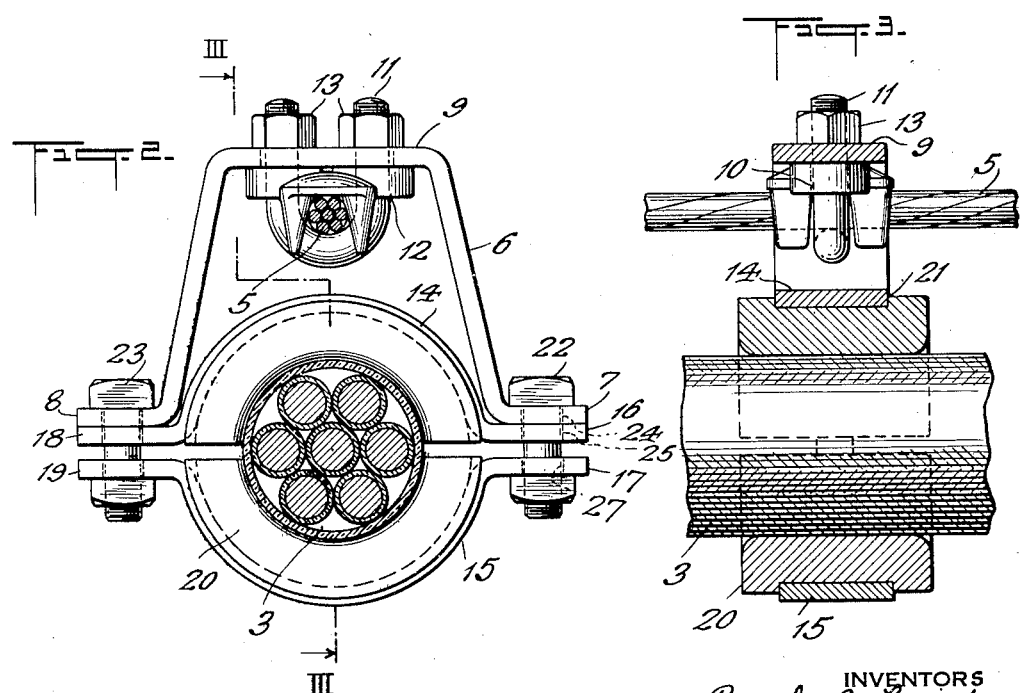
INVENTORS
Beverly A. Lundy
Frederick C. Lavarack
BY
Lyman E. Dodge
ATTORNEY Patented Jan. 30, 1934

1,945,488

UNITED STATES PATENT OFFICE 1,945,488

CABLE SUPPORT

Frederick C. Lavarack, Montclair, N. J., and Beverly A. Lundy, Larchmont, N. Y., assignors to Railroad Accessories Corporation, New York, N. Y., a corporation of New York Application March 5, 1932. Serial No. 597,046

1 Claim. (Cl. 173—251)

This invention relates to electrical apparatus, particularly electric conductors, and more especially supports for assembled electrical conductors commonly known as, cables.

Those familiar with the art of railway signalling know that, at the present time, the number of wires stretched along the railway track is so great that it frequently becomes most economical to assemble the wires into the form of a cable. This cable is supported by suitable cable hangers from what is known as a messenger wire or cable. The cable hangers, generally allow the cable to move somewhat lengthwise of the messenger wire. This proves satisfactory except at those places where the cable must dip down from the top of the supporting poles to some track side apparatus. At such position the cable support and hanger must be of such a nature that it will not only prevent the cable from moving relatively to it, but also of such a nature that it will not move relatively to the messenger wire.

A principal object of the present invention is to provide a cable support or hanger of such a nature that it will be especially applicable for the supporting of a cable at those places where the cable is supported by a messenger wire positioned other than horizontally.

Other objects and advantages will appear as the description of the particular physical embodiment selected to illustrate the invention progresses, and the novel features of the invention will be particularly pointed out in the appended claims.

In describing the invention in detail, and the particular physical embodiment selected to illustrate the invention, reference will be had to the accompanying drawing and the several views thereon, in which like characters of reference designate like parts throughout the several views, and in which:

Figure 1 is a somewhat schematic elevational view of a railway track with a cable supported by poles adjacent thereto, and a trackway device to which the cable goes; Fig. 2, is a side elevational view of my improved cable support; Fig. 3, is a sectional view of the device as shown by Fig. 2, on the plane indicated by the line III—III of Fig. 2, viewed in the direction of the arrows at the ends of the line.

In Fig. 1, numeral 1 designates a railway track alongside of which is the railway box 2 to which a cable 3, supported by poles 4 on messenger wire 5, goes.

In Fig. 1 my improved cable support is indicated as a whole by C.

Just so long as the messenger wire 5 is horizontal, as shown both to the right and to the left of Fig. 1, a cable support or hanger may be used to support cable 3 which may be itself movable along the messenger wire and which also allows the cable to move relatively to it, but when the cable dips as to a relay box such as 2, then it is desirable and sometimes necessary to provide a cable hanger which is immovable as respects the messenger wire 5 and also so firmly holds the cable that the cable cannot move relatively to the cable support.

In Figs. 2 and 3, the cable support as devised by me has been illustrated. This support includes a substantially inverted U-shaped member 6, formed, preferably, of flat metal such as iron. This member 6 has the ends of the legs of the U, 7 and 8, bent outwardly at about a right angle, and the base 9 of the U-shaped member is orificed, as at 10, for the reception of the two legs of the U bolt 11. A messenger wire or cable saddle 12 is provided which is embraced by the U bolt and which in turn embraces the messenger wire or cable 5. Nuts 13 are provided by which the U bolt 11 may be drawn up tightly so as to force the saddle against the inside face of the base 9 while nuts bear against the outside face of the base 9 thereby holding the messenger wire tightly, so that no movement relatively to member 6 takes place.

Applicant provides two semi-annuli 14 and 15, the ends of which, 16, 17, 18 and 19, are bent outwardly so as to be positioned parallel to the ends 7 and 8 of the member 6.

Applicant also provides a split annulus 20 of insulating material. This annulus is provided with a groove 21 within which the semi-annuli 14 and 15 are positioned, thus preventing a movement of the split annulus relatively to the semi-annuli.

The cable 3 is positioned within the split annulus 20, and is held tightly therein by pressure exerted thereon by the two ends of the annulus 20. This pressure is obtained by means of the bolts 22 and 23 which pass through orifices as 24, 25, and 27 in the bent ends 7, 16 and 17.

With applicant's cable support a cable such as 3, in a situation such as is shown by Fig. 1, is firmly held so that it does not move relatively to the support because the split annulus 20 firmly grasps the cable. The cable support cannot move relatively to the messenger wire 5 because the saddle 12 with the U bolt 11 together with member 6 are all clamped firmly together by the nuts 13. By the use of applicant's cable support, all sagging of a cable, such as 3, in a situation such as is shown by Fig. 1 is avoided.

Although I have particularly described one particular physical embodiment of my invention and explained the principle and mode of operation thereof, nevertheless, I desire to have it understood that the form selected is merely illustrative, but does not exhaust the possible physical embodiments of the idea of means underlying my invention.

What I claim as new and desire to secure by Letters Patent of the United States, is:

In a cable support, in combination: a substantially inverted U-shaped member formed with the ends of the legs bent outwardly at about a right angle, said ends being each formed with a bolt receiving orifice and the base of the U formed with orifices adapted for receiving the legs of a U bolt; a U bolt having its legs passing through the orifices therefor, and nuts screwed upon said legs and bearing against the outside face of the base of the U-shaped member; a messenger wire saddle between the inside face of the U-shaped member and the U bolt adapted to receive a messenger wire between it and the U bolt; two substantially semi-annuli, each having its ends bent outwardly and positioned parallel to each other and to the bent ends of the U-shaped member and each formed with an orifice for the reception of a bolt; a split annulus of insulating material formed with a peripheral groove into which the said semi-annuli fit and bolts each provided with a head on one end and a nut on the other passing through the orifices in the semi-annuli and the U-shaped member whereby a cable received within the split annulus may be firmly held by tightening the nuts on said bolts.

FREDERICK C. LAVARACK.
BEVERLY A. LUNDY.